United States Patent [19]

Waldron et al.

[11] Patent Number: 5,232,493
[45] Date of Patent: Aug. 3, 1993

[54] PROCESS FOR STABILIZING ZINC PYRITHIONE PLUS CUPROUS OXIDE IN PAINT

[75] Inventors: Craig Waldron, Waterbury; Rahim Hani, Cheshire; Douglas A. Farmer, Jr., Madison; Charles E. Branch, Norwalk, all of Conn.

[73] Assignee: Olin Corporation, Cheshire, Conn.

[21] Appl. No.: 938,961

[22] Filed: Sep. 1, 1992

[51] Int. Cl.$^5$ ............................................. C09D 5/14
[52] U.S. Cl. ................................... 106/18.33; 106/16; 106/18.34; 514/188; 514/345; 514/499; 514/500; 424/78.09
[58] Field of Search ................ 106/15.05, 16, 18.33, 106/18.34; 514/188, 345, 499, 500; 71/67; 424/78.09

[56] References Cited

U.S. PATENT DOCUMENTS

| 3,615,744 | 10/1971 | Yokoo et al. | 106/15.05 |
| 4,039,312 | 8/1977 | Patru | 106/16 |
| 4,581,351 | 4/1986 | Berke et al. | 514/345 |
| 4,918,147 | 4/1990 | Yamamori et al. | 424/78.09 |
| 5,057,153 | 10/1991 | Ruggiero | 106/18.33 |
| 5,098,473 | 3/1992 | Hani et al. | 106/18.33 |
| 5,112,397 | 5/1992 | Farmer, Jr. et al. | 106/18.33 |
| 5,137,569 | 8/1992 | Waldron et al. | 106/18.33 |
| 5,185,033 | 2/1993 | Hani et al. | 106/18.34 |

FOREIGN PATENT DOCUMENTS 0108634 6/1984 European Pat. Off. .
WO91/14743 10/1991 PCT Int'l Appl. .

*Primary Examiner*—Mark L. Bell
*Assistant Examiner*—Anthony J. Green
*Attorney, Agent, or Firm*—Dale Lynn Carlson

[57] ABSTRACT

The present invention relates generally to paints and paint bases, and, more specifically to a process and composition for providing a stable gel-free dispersion of zinc pyrithione plus cuprous oxide biocide in paint. In accordance with the process of the present invention, the paint or paint base is essentially water-free, and preferably contains a desiccant in order to impart desired gelation-inhibition to the paint.

4 Claims, No Drawings

PROCESS FOR STABILIZING ZINC PYRITHIONE PLUS CUPROUS OXIDE IN PAINT

BACKGROUND OF THE INVENTION

The present invention relates generally to paints and paint bases, and, more specifically to a process for providing a stable, gel-free dispersion of zinc pyrithione plus cuprous oxide biocide in paint.

BACKGROUND OF THE INVENTION

Combinations of zinc pyrithione and cuprous oxide are known to be excellent antifouling agents when formulated into paints and paint bases (i.e., the paint before pigment addition) also containing rosin, as disclosed, for example, in U.S. Pat. No. 5,057,153. Unfortunately, however, such paints have now been found to thicken or gel unacceptably within a few days, at best, or a few hours, at worst, when formulated with typical commercial grades of zinc pyrithione in combination with cuprous oxide.

Heretofore, various solutions to the problem of gellation of paints containing rosin and zinc pyrithione in combination with cuprous oxide, have been suggested. Illustrative solutions have been to use rigorously purified zinc pyrithione, as disclosed in U.S. Pat. No. 5,098,473, or to add amines or esterified rosin, as disclosed in U.S. Pat. No. 5,112,397, or to use a metal salt of rosin, as disclosed in U.S. Pat. No. 5,137,569. Since these solutions may have drawbacks such as increased cost or lack of compatibility with some paints, a new, economical solution to the problem would be highly desired by the paint manufacturing community in order to maximize flexibility in using this combination of biocides in view of its excellent biocidal activity.

Marine paints have been made comprising a film-forming polymeric binder which is a salt or ester of a polyanion, but utilizing other biocides, namely metal salts of dithiocarbamates, and the tendency of these paints to gel is said to be reduced by the presence in the paint of a molecular sieve zeolite, as disclosed in European Patent Application 0,108,634 A1. However, further improvements in providing a paint having an excellent combination of gellation resistance and improved biocidal efficacy would be highly desired by paint manufacturers.

SUMMARY OF THE INVENTION

In one aspect, the present invention relates to a paint or paint base composition characterized by enhanced biocidal efficacy and gellation resistance wherein the paint or paint base contains a wood rosin, cuprous oxide and zinc pyrithione and wherein the paint or paint base is essentially water-free. This essentially water-free paint or paint base composition is resistant to gellation during storage thereof.

In another aspect, the present invention relates to a process for providing a gellation-inhibited solvent-based paint or paint base containing zinc pyrithione and cuprous oxide which comprises the steps of:

(a) incorporating wood rosin, zinc pyrithione and cuprous oxide into a silent-based paint or paint base to provide a biocide-containing paint or paint base, said zinc pyrithione being present in an amount of between about 1% and about 25% (preferably 5-25%, more preferably 10-25%), said cuprous oxide being present in an amount of between about 20% and about 70%, the total amount of said pyrithione salt plus said cuprous oxide being between about 20% and about 80%, and said wood rosin being present in an amount of between about 1% and about 15% (preferably 2%-10%, more preferably 3%-7%), said weight percents being based upon the total weight of the biocide-containing paint or paint base, and (b) removing water from (preferably by means of a desiccant) said biocide-containing paint or paint base to provide an essentially water-free paint or paint base exhibiting enhanced gellation resistance.

In yet another aspect, the present invention relates to a process for ungelling a gelled paint containing at least some amount of gels which comprises contacting the gelled paint with a desiccant and an organic solvent.

These and other aspects of the invention will become apparent upon reading the following detailed description of the invention.

DETAILED DESCRIPTION OF THE INVENTION

In accordance with the present invention, it has now been surprisingly found that the tendency toward gellation of a paint containing zinc pyrithione, wood rosin, and cuprous oxide is significantly reduced by reducing the amount of water in the paint. The resulting essentially water-free paint is stable against gellation during storage. It has also been surprisingly paint can be rendered ungelled, by removing essentially all of the water from the paint using a desiccant.

As used herein, the term "essentially water free" is intended to designate a paint or paint base that contains less than 500 ppm, preferably less than 100 ppm, more preferably less than 50 ppm, of water.

Preferably, a desiccant is used to remove water from the paint. Preferred desiccants include alkaline earth metal oxides such as barium oxide, magnesium oxide, and the like, as well as molecular sieves, activated alumina, silica gel, paraffin wax and water-absorbing clays, including natural and synthetic clays. Other organic desiccants, such as dicyclohexyldicarbodiimide, are also suitably employed in accordance with the present invention. Suitable clays include kaolin, montomorillonite bentonite), clay mica (muscovite), and chlorite (hectonite), and the like. Particularly preferred desiccants include molecular sieves, activated alumina and alkaline earth metal oxides. Magnesium sulfate has been found not to e useful as a desiccant in the process of the present invention.

A desiccant plus a solvent for the paint are suitably employed to remove gels in a gel-containing paint, or to ungel a gelled paint. The solvent is added to replenish the paint, and preferably the solvent is added in an amount of between about 1% and about 25%, more preferably between 5%-10%, based upon the weight of the paint or paint base.

The amount of desiccant employed in the compositions and processes of the present invention is preferably between about 1% and about 30%, more preferably between about 5% and about 20%, most preferably between 5% and about 15%, based upon the weight of the paint or paint base.

As an alternative to the use of a desiccant, the paint may also be rendered water-free by the use of other drying techniques such as, for example, azeotropic distillation, or by using a dry box or a nitrogen pad during fabrication of the desired paint with dry starting materials to provide the desired water-free paint.

Although the improved biocidal efficacy and gellation resistance advantages associated with the present invention are expected to provide advantages when used in a wide variety of paints, including indoor and outdoor household paints, industrial and commercial paints, particularly advantageous results are obtained when the process and composition of the present invention are utilized in conjunction with marine paints for use, for example, on ship's hulls. In addition, the composition and process of the present invention provides highly desirable results in the context of exterior paints of both the latex and alkyd types.

Typically, a paint composition will contain a resin, an organic solvent (such as xylene or methylisobutylketone), a pigment, and various optional additives such as thickening agent(s), wetting agents, and the like, as is well-known in the art. The resin is preferably selected from the group consisting of vinyl, alkyd, epoxy, acrylic, polyurethane and polyester resins, and combinations thereof. The resin is preferably employed in an amount of between about 20% and about 80% based upon the weight of the paint or paint base.

In addition, the paint composition of the present invention optionally additionally contains optional additives which have a favorable influence on the viscosity, the wetting power and the dispersibility, as well as on the stability to freezing and electrolytes and on the foaming properties. The total amount of optional additives is preferably no greater than 20% by weight, more preferably between about 1% and about 5% by weight, based upon the total weight of the paint composition.

Illustrative thickening agents include cellulose derivatives, for example methyl, hydroxyethyl, hydroxypropyl and carboxymethyl cellulose, poly(vinyl alcohol). Poly (vinylpyrolidone). Poly(ethylene-glycol), salts of poly(acrylic acid) and salts of acrylic acid/acrylamide copolymers.

Suitable wetting and dispersing agents include sodium polyphosphate, aryl or alkyl phosphates, salts of low-molecular-weight poly(acrylic acid), salts of poly(ethane-sulfonic acid), salts of poly (vinylphosphonic acid), salts of poly(maleic acid) and salts of copolymers of maleic acid with ethylene, 1-olefins with 3% to 18% carbon atoms and/or styrene.

In order to increase the stability to freezing and electrolytes there may be added to the paint composition various monomer 1,2-diols, for example glycol, propylene-glycol-(1,2), and butylene-glycol-(1,2) or polymers thereof, or ethoxylated compounds, for example reaction products of ethylene oxide with long-chain alkanols, amines, carboxylic acids, carboxylic acid amides, alkyd phenols, poly(propylene-glycol) or poly(butylene-glycol).

The minimum temperature of film formation (white point) of the paint composition may be reduced by adding solvents, such as ethylene-glycol, butyl-glycol, ethyl-glycol acetate, ethyl-diglycol acetate, butyl-diglycol acetate, benzene or alkylated aromatic hydrocarbons. As defoaming agents there are suitable for example poly(propylene-glycol) and polysiloxanes.

The paint composition of the present invention may be used as a paint for natural or synthetic 1 materials, for example wood, paper, metals, textiles and plastics. It is particularly suitable as an outdoor paint, and is excellent for use as a marine paint.

The invention is further illustrated by the following Examples. Unless otherwise stated, the "parts" and "%" are "parts by weight" and "percent by weight", respectively based upon the weight of the paint or paint base.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

COMPARATIVE EXAMPLE A

Demonstration of Gellation Results in a paint Containing Cuprous Oxide plus Zinc Pyrithione and Wood Rosin A paint was prepared using the following formulation:

The solvent mixture used was a 2:1 mixture of MIBK and xylene (called mixed solvent).

The zinc pyrithione used was standard commercial grade and assayed 97.8% pure by iodometric titration.

| Material | Parts | % |
| --- | --- | --- |
| VAGH resin (1) | 9.3 | 2.95 |
| DISPERBYK 163 (2) | 5.1 | 1.62 |
| Tricresyl Phosphate | 6.45 | 2.05 |
| Cuprous Oxide | 170.0 | 54.0 |
| Zinc pyrithione powder | 16.0 | 5.08 |
| Wood Rosin (4) | 16.0 | 5.08 |
| Solvent Mixture | 92.0 | 29.22 |

(1) vinyl chloride-vinyl acetate-vinyl alcohol terpolymer, a Product of Union Carbide Corporation.
(2) a high molecular weight block copolymer, a product of BYK-Chemie.
(3) titanium dioxide, a product of DuPont Company.
(4) a product of Hercules, Incorporated The procedure employed for preparing the paint was as follows:

(1) A one pint paint can was charged with 41.93 g of a 22.2% VAGH resin solution in a 2:1 mixture by volume of MIBK and xylene.
(2) A mixture of 5.1 g Disperbyk 163 and 5.1 g mixed solvent was added.
(3) Tributyl phosphate was added to the paint can and mixed with a high speed disperser at 1000 RPM for 10 minutes.
(4) The cuprous oxide, zinc pyrithione, and 5.0 g solvent were added to the paint can and mixing was continued at 7000 RPM for 1 hr.
(5) The mixing speed was reduced to 2500 RPM and 15 g of mixed solvent was added.
(6) Once the temperature dropped from 45° C. to below 35°, a solution of 16 g of wood rosin in 30 g of mixed solvent was added to the can and the mixture was mixed for 1.0 hr. at 2500 RPM.

The paint formulation made according to this procedure was analyzed for water and found to contain 0.4 weight percent of water based upon the weight of the formulation. The formulation was of suitable viscosity for application by brush immediately after preparation, but thickened to an unpourable paste after approximately 6 hours.

EXAMPLES OF PAINTS OF THE PRESENT INVENTION

General Procedure for Making Essentially Water-Free Paints Used in all of the Following Examples

Mill Base (MB)

(1) A one pint paint can was charged with 35.2 g of a 22.2% VAGH resin solution in a 2:1 mixture by volume of MIBK and xylene.

(2) A mixture of 5.4 g Disperbyk 163 and 4.0 g mixed solvent was added to the can, along with 7.2 g of tricresyl phosphate.

(3) The above materials were mixed with a high speed disperser at 1000 RPM for 10 minutes.

Pigment Grind (PG)

(4) The specified amounts of desiccant, cuprous oxide, zinc pyrithione (added as zinc OMADINE ® biocide, a product of Olin Corporation), and 20.0 g solvent mixture in aliquot portions to provide a good pigment grind were added to the paint can and mixing was continued at 7000 RPM for 1 hour. The sample temperature was kept below 45° C. using a water bath.

Letdown Stage (LD)

(5) Next a solution of 14.5 g of the rosin in 25 g of mixed solvent was added to the can and the mixture was mixed for 1.0 hr at 4000 RPM.

(6) The solvent mixture which was lost during work-up was added back to the paint and mixed for 5 minutes. Solvent mixture used was a 40% mixture of xylene and 60% MIBK.

| EXAMPLE I Paint Composition Using 15 wt. % of ⅛ Inch Diameter Molecular Sieves | | |
|---|---|---|
| INGREDIENT | MASS | PERCENT |
| MOLEC. SIEVES POWDER (1) | 25.00 | 14.73 |
| VAGH RESIN (22%) | 3.90 | 2.30 |
| DISPERBYK 163 | 2.70 | 1.59 |
| CUPROUS OXIDE | 75.00 | 44.20 |
| Zn pyrithione | 7.75 | 4.57 |
| TRICRESYL PHOSPHATE | 3.60 | 2.12 |
| WOOD ROSIN | 7.75 | 4.57 |
| SOLVENT MIXTURE* | 44.00 | 25.93 |
| TOTAL | 169.70 | 100.00 |

(1) Molec. sieves 4A, a product of Aldrich Chemical Co. Inc..
*60% MIBK/40% XYLENE The paint of Example I was found to have less than 500 ppm of water and was of a suitable viscosity for application by brush 10 weeks after its preparation.

| EXAMPLE II Paint Composition Using 5 wt. % Molecular Sieves Having a 2-3 Microns particle size | | |
|---|---|---|
| INGREDIENT | MASS | PERCENT |
| MOLEC. SIEVES POWDER (1) | 7.25 | 4.93 |
| VAGH RESIN (22%) | 3.90 | 2.65 |
| DISPERBYK 163 | 2.70 | 1.84 |
| CUPROUS OXIDE | 75.00 | 51.04 |
| Zn pyrithione | 7.25 | 4.93 |
| TRICRESYL PHOSPHATE | 3.60 | 2.45 |
| WOOD ROSIN | 7.25 | 4.93 |
| SOLVENT MIXTURE* | 40.00 | 27.22 |
| TOTAL | 146.95 | 100.00 |

(1) Product of Aldrich Chemical Co. Inc.
*60% MIBK/40% XYLENE

The paint of Example II contained less than 500 ppm of water, and thickened slightly but was still of suitable viscosity for application by brush 10 weeks after its preparation.

| EXAMPLE III 15 wt. % of BAYLITH L Powder Molecular Sieves 3A | | |
|---|---|---|
| INGREDIENT | MASS | PERCENT |
| MOLEC. SIEVES POWDER (1) | 24.70 | 15.02 |
| VAGH RESIN (22%) | 3.90 | 2.37 |
| DISPERBYK 163 | 2.70 | 1.64 |
| CUPROUS OXIDE | 75.00 | 45.62 |
| Zn pyrithione | 7.25 | 4.41 |
| TRICRESYL PHOSPHATE | 3.60 | 2.19 |
| WOOD ROSIN | 7.25 | 4.41 |
| SOLVENT MIXTURE* | 40.00 | 24.33 |
| TOTAL | 164.40 | 100.00 |

(1) Product of Miles Inc.
*60% MIBK/40% XYLENE

The paint of Example III contained less than 500 ppm of water, and was of suitable viscosity for application by brush 10 weeks after its preparation.

| EXAMPLE IV Using 15 wt. % Silica Gel Desiccant | | |
|---|---|---|
| INGREDIENT | MASS | PERCENT |
| SILICA GEL (1) | 24.70 | 15.02 |
| VAGH RESIN (22%) | 3.90 | 2.37 |
| DISPERBYK 163 | 2.70 | 1.64 |
| CUPROUS OXIDE | 75.00 | 45.62 |
| Zn Pyrithione | 7.25 | 4.41 |
| TRICRESYL PHOSPHATE | 3.60 | 2.19 |
| WOOD ROSIN | 7.25 | 4.41 |
| SOLVENT MIXTURE* | 40.00 | 24.33 |
| TOTAL | 164.40 | 100.00 |

(1) Keselgel 60, a product of EM Reagents.
*60% MIBK/40% XYLENE

This paint product contained less than 500 ppm of water and was stable for two to three days.

| EXAMPLE V Using as a Desiccant 15% Alumina Neutral Al Oxide | | |
|---|---|---|
| INGREDIENT | MASS | PERCENT |
| ALUMINA (2) | 24.70 | 15.02 |
| VAGH RESIN (22%) | 3.90 | 2.37 |
| DISPERBYK 163 | 2.70 | 1.64 |
| CUPROUS OXIDE | 75.00 | 45.62 |
| Zn Pyrithione | 7.25 | 4.41 |
| TRICRESYL PHOSPHATE | 3.60 | 2.19 |
| WOOD ROSIN | 7.25 | 4.41 |
| SOLVENT MIXTURE* | 40.00 | 24.33 |
| TOTAL | 164.40 | 100.00 |

(2) Alumina N, Act I, a product of Fisher Scientific.
*60% MIBK/40% XYLENE

This paint product contained less than 500 ppm of water and was stable for one week.

| EXAMPLE VI Using Barium Oxide as a desiccant | | |
|---|---|---|
| INGREDIENT | MASS | PERCENT |
| BARIUM OXIDE (3) | 11.33 | 7.50 |
| VAGH RESIN (22%) | 3.90 | 2.58 |
| DISPERBYK 163 | 2.70 | 1.79 |
| CUPROUS OXIDE | 75.00 | 49.66 |
| Zn Pyrithione | 7.25 | 4.80 |
| TRICRESYL PHOSPHATE | 3.60 | 2.38 |
| WOOD ROSIN | 7.25 | 4.80 |
| SOLVENT MIXTURE* | 40.00 | 26.48 |

-continued

EXAMPLE VI
Using Barium Oxide as a desiccant

| INGREDIENT | MASS | PERCENT |
|---|---|---|
| TOTAL | 151.03 | 100.00 |

(3) Product of Aldrich Chemical Co. Inc.
*60% MIBK/40% XYLENE

The above sample was gel free after 2 weeks.

EXAMPLE VII
Demonstration of a gelled paint being Ungelled
A paint was prepared using the following formulation.

| INGREDIENT | MASS | PERCENT |
|---|---|---|
| VAGH RESIN (22%) | 3.90 | 2.44 |
| DISPERBYK 163 | 2.70 | 1.69 |
| CUPROUS OXIDE | 91.00 | 56.96 |
|  |  | (57.0%) |
| Zn Pyrithione | 7.75 | 4.85 |
| TRICRESYL PHOSPHATE | 3.60 | 2.25 |
| WOOD ROSIN | 7.75 | 4.85 |
| SOLVENT MIXTURE* | 43.00 | 26.93 |

This paint was made according to the general procedure described above. This paint had thickened to an unpourable paste after 6 hours and had gelled after approximately 15 hours.

General procedure for ungelling a gelled paint.
(1) Added 5-10% (wt) of solvent to the gelled paint. Chopped the gel up with a spatula.
(2) Dispersed at 4000 rpm for 30 minutes.
(3) Added 15% (wt) (24.7 g) of Molecular Sieves 4A powder Aldrich.

Following this procedure, the ungelled paint was stable after 10 weeks.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A process for providing a gellation-inhibited solvent-based paint or paint base containing zinc pyrithione and cuprous oxide which comprises the steps of:
    (a) incorporating wood rosin, zinc pyrithione and cuprous oxide into a solvent-based paint or paint base to provide a biocide-containing paint or paint base, said zinc pyrithione being present in an amount of between about 1% and about 25%, said cuprous oxide being present in an amount of between about 20% and about 70%, the total amount of said zinc pyrithione plus said cuprous oxide being between about 20% and about 80%, and said wood rosin being present in an amount of between about 1% and about 15%, said weight percents being based upon the total weight of the biocide-containing paint or paint base, and
    (b) removing water from said biocide-containing paint or paint base to provide an essentially water-free paint or paint base exhibiting enhanced gellation resistance.

2. The process of claim 1 wherein said paint or paint base contains said zinc pyrithione in an amount of between about 5% and about 25% weight percent, said wood rosin in an amount of between about 2% and about 10%, and a desiccant in an amount of between 1% and about 30%, based upon the weight of the paint or paint base, and water in an amount of less than 500 ppm.

3. The process of claim 1 wherein said paint or paint base contains said zinc pyrithione in an amount of between about 10% and about 25% weight percent, said wood rosin in an amount of between about 3% and about 7%, and a desiccant in an amount of between 5% and about 25%, and water in an amount of less than 100 ppm.

4. A process for ungelling a gelled paint containing gels which comprises contacting the gelled paint with a desiccant and an organic solvent in amounts sufficient to remove any gels from said paint.

* * * * *